United States Patent [19]

Mitchell

[11] Patent Number: 5,709,729
[45] Date of Patent: Jan. 20, 1998

[54] FORMULATION AND PRODUCTION OF GROWING MEDIA FROM GREEN ORGANIC MATERIAL

[75] Inventor: Howard J. Mitchell, Bundoora, Australia

[73] Assignee: Environmental and Resource Technology Holdings Pty. Ltd., Australia

[21] Appl. No.: 619,565

[22] PCT Filed: Sep. 27, 1994

[86] PCT No.: PCT/AU94/00577

§ 371 Date: Mar. 27, 1996

§ 102(e) Date: Mar. 27, 1996

[87] PCT Pub. No.: WO95/09138

PCT Pub. Date: Apr. 6, 1995

[30] Foreign Application Priority Data

Sep. 28, 1993 [AU] Australia .................. PM1495

[51] Int. Cl.$^6$ ........................................ C05F 9/04
[52] U.S. Cl. ............................. 71/9; 71/23; 71/24
[58] Field of Search .......................... 71/9, 23, 24

[56] References Cited

FOREIGN PATENT DOCUMENTS

| | | |
|---|---|---|
| 34158/84 | 8/1985 | Australia . |
| 10181/92 | 7/1992 | Australia . |
| 30137/92 | 6/1993 | Australia . |
| 52750/93 | 7/1994 | Australia . |
| 2238529 | 6/1991 | United Kingdom . |
| WO 91/02778 | 3/1991 | WIPO . |

OTHER PUBLICATIONS

K.A. Handrick, *Composting—Making Soil Improver from Rubbish*, pp. 1–8 (1993). No month.

*Primary Examiner*—Ferris Lander
*Attorney, Agent, or Firm*—Burns, Doane, Swecker & Mathis, LLP

[57] ABSTRACT

There is disclosed a method of treating all types of green organic material including small timber pieces, shrubbery, grass cuttings and other green organic material mixing various size components of such organic material together with fertilizer nutrients allowing the mixture to stand in a naturally formed windrow or windrows of substantially triangular cross section with a predetermined amount of moisture therein monitoring the temperature of the windrow until such time as there is a significant drop in temperature indicating that the chemical reaction has been completed.

2 Claims, No Drawings

5,709,729

FORMULATION AND PRODUCTION OF GROWING MEDIA FROM GREEN ORGANIC MATERIAL

This application has been filed under 35 USC 371 and claims benefit of the filing date of International Application PCT/AU94/00577, filed on Sep. 27, 1994, published as WO95/09138 Apr. 6, 1995.

This invention relates to recovery and treatment of green organic material for use in the formulation and production of growing mixtures and/or soil substitutes.

By "green organic material" is meant plant material having been discarded as non-putrescible waste and includes tree and shrub cuttings and prunings, grass clippings, leaves, garden, waste, natural (untreated) timber waste and weeds (noxious or otherwise). In this respect it is standard practice for green organic material to be initially reduced in particle size by using chipping or grinding apparatus.

The increasing need for responsible environmental management of landfill sites means that most local Government instrumentalities are finding that landfill sites are being located further away from populated areas, and are costing considerably more to operate, monitor and control. As a consequence, transfer stations are being developed in many urban areas. Waste is collected at transfer stations and then transported to landfill sites. With the advent of transfer stations as a method of waste management, the need for waste minimization and recycling methods has become greater. Unless the additional waste management costs of constructing transfer stations, new landfill sites and transportation of waste is offset by a reduction in the existing solid waste stream, the only outcome that can be expected is a corresponding sharp increase in charges for waste disposal.

Many administrative bodies in Australia have recognized green organic material as being a substantial component of the municipal solid waste stream and have attempted several waste minimization and/or recycling methods. Industrial chippers and shredders have been used to reduce the volume of green organic material down to much smaller particle sizes. The processing costs associated with this method has generally been matched by the savings in actual waste disposal costs to the landfills.

Additionally some local Government instrumentalities have tried to sell or otherwise dispose of the processed green organic material as a garden mulch and/or used the material within their own Parks and Garden departments.

Whilst this attempt at recycling of green organic material appears to be innovative there is a now a realisation that there is a high likelihood of potential environmental hazards caused by the probability of infestation of green organic material with pathogenic microorganisms, insects, parasitic fungi and weed seeds. If the green organic material is processed by grinding and/or shredding into mulch then the parasitic fungi and pathogens can multiply at a great rate because of the supply of additional nutrient brought about through the breaking down of the plant material. Accordingly it is essential that the processed green organic material is treated in some way to destroy the pathogens, insects, fungi and weed seeds to enable the use of the mulch in other areas without the spreading of disease and weed infestation. Otherwise there is a likelihood of severely retarding existing plant growth and plant life through the introduction of a mulch produced from untreated green organic material.

Attempts have been made to compost green organic material and market the treated product as a mulch. This method has proved expensive to implement and operate and the market potential for sales of the composted garden mulch at a cost recovery price is very low.

Limited statistics are available on the volume of green organic material in the metropolitan area of Melbourne which can be assumed to be similar to that in other capital cities and suffice to say that there are significant quantities of green organic material available as a source material for the production of plant growing mixtures and media.

The objective of the present invention is to utilize all types of green organic material that is currently available including timber pieces as well as greenery such as foliage and grass. A major exception to the use of green organic material is the exclusion of treated timbers or treated waste which may not be in a condition to undergo natural chemical reaction or would be likely to adversely affect any natural chemical reaction during treatment of the green organic material according to the invention, and/or pose an unacceptable environmental risk.

According to the present invention there is provided a method of pasteurizing, treatment or stabilization of green organic material to render it suitable for use as a growing medium or as a mixing ingredient for a growing medium said process of pasteurization and/or stabilization comprising the steps of grinding any type of natural green organic material to a maximum dimension of less than about 65 mm including green organic material having a maximum dimension of less than 6 mm, thoroughly mixing suitable nutrients into the green organic material, adding water to the mix to achieve maximum moisture content in the mixture, forming a windrow of substantially triangular cross-sectional configuration having a height in the range of 1.5 to 2.5 meters, the amount of nutrient and moisture being such that the internal temperature of the windrow reaches a maximum of 70° C. being sufficient to substantially destroy pathogenic organisms, insects, fungi, propagative plant material and weed seeds, turning over the outer layers of the windrow to complete the process.

There is also provided according to the present invention a process of pasteurizing treatment and/or stabilization of green organic material comprising the steps of grinding any type of natural green organic material to a maximum dimension of less than about 65 mm including up to 50% of material having a maximum dimension in the range of 40–25 mm but which may have a zero content, between 10–40% material having a maximum dimension in the range of 25–15 mm, 20–40% of material having a maximum dimension of 15–6 mm and 20–40% of material having a maximum dimension of less than 6 mm, adding moisture and nutrients to the mixture the amount of moisture being the maximum absorbable by the mix, thoroughly mixing the material and forming it into a windrow or windrows having a substantial triangular cross-section and a height in the range of 1.5–2.5 meters, the amount of moisture and nutrient being such that the internal temperature of the windrow reaches a maximum temperature of 70° C. and turning the outer layers of the windrow to the inside of the windrow to complete the temperature treatment process.

Conveniently the nutrient is obtained from ammonium nitrate mixed in with the green organic material and during the operation of the process the ammonium nitrate breaks down to nitrate nutrients and ammonium and ammonia gas such that any residue is expelled as gas.

The stabilization process operates over a three step procedure of three different temperature ranges and only ambient to about 20° C. for a first group of bacteria (mesophilic), about 20°–50° C. for a second group of bacteria (mesophilic) and about 50°–70° C. for the third group of bacteria (thermophilic) such that when the temperature of the windrow reaches 70° C., the population of all bacterial groups are significantly reduced through a combination of temperature increases, reduction in moisture and a reduction in nutrient supply.

As soon as the bacterial groups have declined, the internal temperature of the windrow cannot be maintained and it quickly falls back to ambient temperature. According to the invention this internal temperature is closely monitored to ascertain the completion or at least part completion of the process. According to the invention after completion of the process the stabilized mixture is screened, preferably through four separate screen sizes having apertures approximately of the following sizes: 25 mm, 19 mm, 10 mm and 6 mm to allow the formulation of a growing medium employing the stabilized mixture made according to the invention as the core component of the growing medium.

According to the invention the green organic material can be treated and converted into a marketable product as a potting mix and allied products for use in land maintenance and container plant cultivation for a large range of plants and trees, whilst establishing an effective, economical and permanent system for removal of green organic material from the solid waste stream destined for landfill etc.

There is also provided according to the invention the production of a growing .mixture made in accordance with the processes described in this specification for use in the manufacture of packaged and unpackaged growing media including potting mixtures.

It will be appreciated the production manufacturing process can be operated on a commercial basis using an industrial grinder/shredder that will produce a minimum of 30 cubic meters of processed green organic material per hour and a green organic material and nutrient mixing plant which can produce a minimum of 45 cubic meters of mixed green organic material per hour whilst a windrow turning machine controlled by an operator can turn a minimum of 150 cubic meters of green organic material per hour.

Finally, the screening plant can be designed to screen a minimum of 50 cubic meters of stabilized green organic material per hour made according to the invention. Further aspects of the production process can include a mixing and blending plant for the formulation of finished plant growing medium as well as storage facilities and a bagging plant for the packaged products.

The invention will now be described in greater detail with reference to three examples as follows.

EXAMPLE 1

300 cubic meters of chipped, green organic material is received for blending. This material consists of approximately 30 cubic meters of chipped woody material and bark having a dimension of 26 mm to 60 mm constituting approximately 10% of the total bulk volume, approximately 60 cubic meters of chipped woody material and bark having a dimension of 19 mm to 25 mm constituting approximately 20% of the total bulk volume, approximately 90 cubic meters of shrubbery, light woody material, leaves and bark having a dimension of 11 mm to 18 mm constituting approximately 30% of the total bulk volume, approximately 60 cubit meters of shrubbery, light woody material, leaves, bark and grass clippings having a dimension of 7 mm to 10 mm constituting approximately 20% of the total bulk volume and the remainder being approximately 60 cubic meters of shrubbery, light woody material, leaves, barks and grass clippings having a dimension up to 6 mm constituting approximately 20% of the total bulk volume.

The material is then mixed with three fertilizers in the following proportions: Ammonium nitrate ($NH_4NO_3$) @ 1.5 kgs per cubic meter, Ferrous (iron) sulphate ($FeSO_4 7H_2O$) @ 300 g per cubic meter and Calcium Sulphate (gypsum) ($CaSO_4 2H_2O$) $2H_2O$) @ 4 kgs per cubic meter. Water is added to this mixture so as to achieve a moisture content of between 50% (50 g water and 50 g dry organic material) and 60% (60 g water and 40 g dry organic material).

The blended green organic material, fertilizers and water is then formed into a windrow of triangular cross section having a height of approximately 2.4 meters, a base of approximately 4 meters, and a length of approximately 45 meters.

The internal temperature at an approximate depth of 700 mm from the outer perimeter of the windrow is monitored and readings taken at least once daily. The temperature readings of a particular windrow were as follows:

|        | Temp. Reading 1 | Temp. Reading 2 | Temp. Reading 3 |
|--------|-----------------|-----------------|-----------------|
| Day 1  | 13              | 15              | 14              |
| Day 2  | 24              | 22              | 20              |
| Day 3  | 30              | 29              | 26              |
| Day 4  | 55              | 43              | 47              |
| Day 5  | 65              | 61              | 63              |
| Day 6  | 70              | 71              | 69              |
| Day 7  | 68              | 70              | 71              |
| Day 8  | 50              | 52              | 51              |

Once the temperature readings indicate a significant drop in the internal temperature, the windrow is then turned over so that the outer volume of the windrow becomes the inner volume of the new windrow. The process of temperature monitoring is continued on a daily basis and the readings taken of this particular windrow were as follows:

|         | Temp. Reading 1 | Temp. Reading 2 | Temp. Reading 3 |
|---------|-----------------|-----------------|-----------------|
| Day 9   | 27              | 30              | 28              |
| Day 10  | 42              | 42              | 45              |
| Day 11  | 53              | 54              | 50              |
| Day 12  | 60              | 57              | 58              |
| Day 13  | 65              | 61              | 63              |
| Day 14  | 70              | 71              | 69              |
| Day 15  | 60              | 62              | 58              |

Once the temperatures taken indicate a decrease, the bioremediation process is complete.

EXAMPLE 2

200 cubic meters of chipped, green organic material is received for blending. This material consists of approximately 40 cubic meters of chipped woody material and bark having a dimension of 26 mm to 60 mm constituting approximately 20% of the total bulk volume, approximately 40 cubic meters of chipped woody material and bark having a dimension of 19 mm to 25 mm constituting approximately 20% of the total bulk volume, approximately 50 cubic meters of shrubbery, light woody material, leaves and bark having a dimension of 11 mm to 18 mm constituting approximately 25% of the total bulk volume, approximately 30 cubic meters of shrubbery, light woody material, leaves, bark and grass clippings having a dimension of 7 mm to 10 mm constituting approximately 15% of the total bulk volume and the remainder being approximately 40 cubic meters of shrubbery, light woody material, leaves, bark and grass clippings having a dimension of 6 mm constituting approximately 20% of the total bulk volume.

The material is then mixed with three fertilizers in the following proportions: Ammonium nitrate ($NH_4NO_3$) @ 1.5 kgs per cubic meter, Ferrous (iron) sulphate ($FeSO_4.7H_2O$) @ 300 g per cubic meter and Calcium sulphate (gypsum) ($CaSO_4.2H_2O$) @ 4 kgs per cubic meter. Water is added to this mixture so as to achieve a moisture content of between 50% (50 g water and 50 g dry organic material) and 60% (60 g water and 40 g dry organic material).

The blended green organic material, fertilizers and water is then formed into a windrow of triangular cross section having a height of approximately 2.0 meters, a base of approximately 3.5 meters, and a length of approximately 30 meters.

The internal temperature at an approximate depth of 700 mm from the outer perimeter of the windrow is monitored and readings taken at least once daily. The temperature readings of a particular windrow were as follows:

|       | Temp. Reading 1 | Temp. Reading 2 | Temp. Reading 3 |
|-------|-----------------|-----------------|-----------------|
| Day 1 | 18              | 21              | 19              |
| Day 2 | 40              | 40              | 40              |
| Day 3 | 55              | 60              | 58              |
| Day 4 | 67              | 67              | 67              |
| Day 5 | 68              | 67              | 70              |
| Day 6 | 70              | 71              | 70              |
| Day 7 | 70              | 71              | 70              |
| Day 8 | 61              | 60              | 63              |

Once the temperature readings indicate a significant drop in the internal temperature, the windrow is then turned over so that the outer volume of the windrow becomes the inner volume of the new windrow. The process of temperature monitoring is continued on a daily basis and the readings taken of this particular windrow were as follows:

|        | Temp. Reading 1 | Temp. Reading 2 | Temp. Reading 3 |
|--------|-----------------|-----------------|-----------------|
| Day 9  | 55              | 50              | 55              |
| Day 10 | 60              | 60              | 60              |
| Day 11 | 70              | 72              | 75              |
| Day 12 | 72              | 70              | 72              |
| Day 13 | 69              | 68              | 70              |
| Day 14 | 58              | 60              | 59              |

Once the temperatures taken indicate a consistent decrease, the bioremediation process is complete.

EXAMPLE 3

120 cubic meters of chipped, green organic material is received for blending. This material consists of approximately 6 cubic meters of chipped woody material and bark having a dimension of 26 mm to 60 mm constituting approximately 5% of the total bulk volume, approximately 30 cubic meters of chipped woody material and bark having a dimension of 19 mm to 25 mm constituting approximately 25% of the total bulk volume, approximately 48 cubic meters of shrubbery, light woody material, leaves and bark having a dimension of 11 mm to 18 mm constituting approximately 40% of the total bulk volume, approximately 18 cubic meters of shrubbery, light woody material, leaves, bark and grass clippings having a dimension of 7 mm to 10 mm constituting approximately 15% of the total bulk volume and the remainder being approximately 18 cubic meters of shrubbery, light woody material, leaves, bark and grass clippings having a dimension of up to 6 mm constituting approximately 15% of the total bulk volume.

The material is then mixed with three fertilizers in the following proportions: Ammonium nitrate ($NH_4NO_3$) @ 1.5 kgs per cubic meter, Ferrous (iron) sulphate ($FeSO_4.7H_2O$) @ 300 g per cubic meter and Calcium sulphate (gypsum) ($CaSO_4.2H_2O$) @ 4 kgs per cubic meter. Water is added to this mixture so as to achieve a moisture content of between 50% (50 g water and 50 g dry organic material) and 60% (60 g water and 40 g dry organic material).

The blended green organic material, fertilizers and water is then formed into a windrow of triangular cross section having a height of approximately 2.4 meters, a base of approximately 4 meters, and a length of approximately 18 meters.

The internal temperature at an approximate depth of 700 mm from the outer perimeter of the windrow is monitored and readings taken at least once daily. The temperature readings of a particular windrow were as follows:

|       | Temp. Reading 1 | Temp. Reading 2 | Temp. Reading 3 |
|-------|-----------------|-----------------|-----------------|
| Day 1 | 10              | 12              | 12              |
| Day 2 | 21              | 22              | 20              |
| Day 3 | 42              | 55              | 56              |
| Day 4 | 62              | 62              | 65              |
| Day 5 | 62              | 65              | 67              |
| Day 6 | 65              | 65              | 65              |
| Day 7 | 50              | 50              | 50              |

Once the temperature readings indicate a significant drop in the internal temperature, the windrow is then turned over so that the outer volume of the windrow becomes the inner volume of the new windrow. The process of temperature monitoring is continued on a daily basis and the readings taken of this particular windrow were as follows:

|        | Temp. Reading 1 | Temp. Reading 2 | Temp. Reading 3 |
|--------|-----------------|-----------------|-----------------|
| Day 8  | 50              | 50              | 50              |
| Day 9  | 62              | 60              | 62              |
| Day 10 | 69              | 68              | 70              |
| Day 11 | 70              | 70              | 70              |
| Day 12 | 67              | 70              | 70              |
| Day 13 | 70              | 67              | 67              |
| Day 14 | 58              | 60              | 58              |

Once the temperatures taken indicate a decrease, the bioremediation process is complete.

I claim:

1. A process of pasteurizing, treatment, and stabilization of green organic material, said process comprising the steps of:

(a) grinding any type of green organic material so as to a maximum dimension of less than about 65 mm to form a mixture comprising between 0 to 50% of material having a maximum dimension in the range of 40 to 25 mm, between 10 to 40% of material having a maximum dimension in the range of 25 to 15 mm, between 20 to 40% of material having a maximum dimension of 15 to 6 mm, and between 10 to 40% of material having maximum dimension of less than 6 mm;

(b) adding moisture and nutrients to the mixture, the amount of moisture being between 50% and 60% of the total blended content weight;

(c) thoroughly mixing the mixture from step (b) and forming it into a windrow or windrows having a substantially triangular cross-section and a height in the range of 1.5 to 2.5 m, the amount of said moisture and nutrients in the mixture being such that microbial activity is achieved at least within the inner portions of the windrow(s) giving rise to an increase in temperature in said inner portions, said temperature passing through three distinct phases: from ambient to about 20° C.; from about 20° C. to 50° C.; and from 50° C. to a maximum temperature of 70° C.; and (d) turning the outer layers of the windrow(s) to the inner portions of the windrow(s) to regenerate microbial activity giving rise to further heating into at least said third phase of 50° C. to about 70° C.

2. A plant propagation mixture or soil made in accordance with the method steps as claimed in claim 1.

* * * * *

UNITED STATES PATENT AND TRADEMARK OFFICE
CERTIFICATE OF CORRECTION

PATENT NO. : 5,709,729
DATED : January 20, 1998
INVENTOR(S) : Howard J. Mitchell It is certified that error appears in the above-identified patent and that said Letters Patent is hereby corrected as shown below:

At Column 6, lines 52-53, delete "a maximum dimension of less than about 65 mm to";

At Column 6, line 61, after "nutrients" insert --selected from the group consisting of ammonium nitrate, ferrous sulphate and calcium sulphate".

Signed and Sealed this

Twenty-fifth Day of August, 1998

Attest:

BRUCE LEHMAN

Attesting Officer

Commissioner of Patents and Trademarks